United States Patent
Lin et al.

(10) Patent No.: US 9,155,128 B2
(45) Date of Patent: Oct. 6, 2015

(54) CONNECTIVE TRANSMISSION DEVICE

(71) Applicants: Inventec Appliances (Pudong) Corporation, Shanghai (CN); INVENTEC APPLIANCES CORP., New Taipei (TW); INVENTEC APPLIANCES (SHANGHAI) CO., LTD, Shanghai (CN)

(72) Inventors: Hsiu-Ping Lin, Wugu Township, Taipei County (TW); Wen-Ching Chang, Wugu Township, Taipei County (TW)

(73) Assignees: INVENTEC APPLIANCES (PUDONG) CORPORATION, Shanghai (CN); INVENTEC APPLIANCES CORP., New Taipei (TW); INVENTEC APPLIANCES (SHANGHAI) CO., LTD., Shanghai (CN)

( * ) Notice: Subject to any disclaimer, the term of this patent is extended or adjusted under 35 U.S.C. 154(b) by 107 days.

(21) Appl. No.: 14/074,088

(22) Filed: Nov. 7, 2013

(65) Prior Publication Data

US 2014/0134952 A1 May 15, 2014

(30) Foreign Application Priority Data

Nov. 12, 2012 (CN) .......................... 2012 1 0451185

(51) Int. Cl.
*H04B 1/38* (2015.01)
*H04W 88/06* (2009.01)
*G06F 1/26* (2006.01)
*H04M 1/725* (2006.01)
*H04R 3/00* (2006.01)
*H02J 7/00* (2006.01)

(52) U.S. Cl.
CPC ................. *H04W 88/06* (2013.01); *G06F 1/26* (2013.01); *G06F 1/266* (2013.01); *H04M 1/72527* (2013.01); *H04R 3/00* (2013.01); *H02J 2007/0062* (2013.01); *H04M 1/72558* (2013.01); *H04R 2420/03* (2013.01); *H04R 2420/07* (2013.01)

(58) Field of Classification Search
CPC .............................. H04W 92/18; H04W 88/00
USPC .............. 455/41.2, 41.3, 557, 558, 3.01, 3.06
See application file for complete search history.

(56) References Cited

U.S. PATENT DOCUMENTS

| 7,209,999 B2 * | 4/2007 | Jamp et al. .................... 710/315 |
| 8,806,011 B1 * | 8/2014 | Graham-Cumming ....... 709/225 |
| 2012/0284772 A1 * | 11/2012 | Kwon et al. ..................... 726/2 |

* cited by examiner

*Primary Examiner* — Sonny Trinh
(74) *Attorney, Agent, or Firm* — Muncy, Geissler, Olds & Lowe, P.C.

(57) ABSTRACT

A connective transmission device of the invention may include a first interface configured to connect to a first device; a second interface configured to connect to a second device; and a control module connected to the first interface and the second interface. When the first interface is connected to the first device and the second interface is connected to the second device, the control module is configured to connect the first device and the second device for data transmission or power transmission, or configured to receive a media message from the first device or the second device.

19 Claims, 6 Drawing Sheets

CONNECTIVE TRANSMISSION DEVICE

CROSS-REFERENCE TO RELATED APPLICATION

This application claims the benefit of China Patent Application No. 201210451185.9, tiled on Nov. 12, 2012, in the State intellectual Property Office, the disclosure of which is incorporated herein its entirety by reference.

BACKGROUND OF THE INVENTION

1. Field of the Invention

The present invention generally relates to a connective transmission device, in particular with respect to a connective transmission device with functions of USB transmission, wireless communication and wireless broadcasting.

2. Description of the Related Art

USA cable, which is applicable to connect with computers with USB interface, may include USB Type-A, USB Type-B, USA Type-AB, Mini-USB, Micro-USB and other connectors.

Bluetooth is defined as Personal Area Network (PAN) communication technology by IEEE 802.15. At present, many devices, such as cell phone, computer and so on are all provided with Bluetooth function, so that near field communication (NFC) can be performed through it.

Broadcasting communication: such as AM/FM broadcasting system, Digital Audio Broadcasting (DAB) and so on.

Each of the aforementioned technics have been well-developed in fields, however, in view of integrating USB cable, Bluetooth and broadcasting communication into a device has not been done yet, the inventor of the present invention therefore designs a USB cable line device which is applicable to NFC and broadcasting communication and wishes to benefit for industrial applicability.

SUMMARY OF THE INVENTION

In view of the above problems, one of objectives of the present invention is to provide a connective transmission device with functions of USB cable line transmission, wireless NFC and broadcasting communication The present invention provides a connective transmission device including a first interface configured to connect to a first device; a second interface configured to connect to second device; and a control module connected to the first interface and the second interface. When the first interface is connected to the first device and the second interface is connected to the second device, the control module is configured to connect the first device, and the second device for data transmission or power transmission, or configured to receive a media message from the first device or the second device.

Preferably, the control module may further have a wireless communication unit configured to receive by wireless communication the media message from the first device or the second device.

Preferably, the control module may further have a wireless broadcasting unit configured to receive or broadcast a broadcasting message. In an embodiment, the control module may further a wireless communication unit configured to transmit by wireless communication the broadcasting message to the first device or the second device, or the broadcasting message is to be transmitted by wire communication to the first device via the first interface or to the second device via the second interface. In another embodiment, the control module may further have an. audio output unit for connecting to a loudspeaker for reproducing or broadcasting the media message, the broadcasting message, or an audio message upon the control module receiving the audio message.

Preferably, the control module may further have a wireless communication unit, and when the second device receives an audio message the second device is configured to transmit the audio message to the control module by the second interface or the wireless communication unit. In another embodiment, the control module further has an audio input unit for receiving an audio input message, and the control module is configured to transmit the audio input message to the second device via the wireless communication unit or the second interface.

Preferably, the first interface may comprise a USB Type-A standard interface.

Preferably, the second interface may comprise a USB Type-A, USB Type-B, USB Type-AB, Mini-USB, or Micro-USB standard interface.

The present invention also provides a connective transmission device including a first interface configured to connect to a first device; a second interface configured to connect to a second device; and a control module connected to the first interface and the second interface. The control module includes a wireless broadcasting unit configured to receive or broadcast a media message; and a connective unit connected to the first interface, the second interface, and the wireless broadcasting unit, wherein when the first interface is connected to the first device and the second interface is connected to the second device, the connective unit is configured to connect the first device and the second device for data transmission or power transmission, and enable the first device or the second device to direct the wireless broadcasting unit to broadcast the media message.

Preferably, the control module may further have a wireless communication unit connected to the connective unit and the wireless broadcasting unit and the wireless communication unit is configured to transmit the media message from the first device or the second device to the wireless broadcasting unit. In another embodiment, the wireless communication unit is configured to operate under Bluetooth standard or a standard for a wireless local area network. In another embodiment, the wireless broadcasting unit is configured to receive or broadcast a broadcasting message, and is configured to transmit the broadcasting message to the first device or the second device through the connective unit or the wireless communication unit. In the embodiment, the control module may further have an audio output unit connected to the wireless broadcasting unit and configured to connect to a loudspeaker for reproducing or broadcasting the media message, the broadcasting message, or an audio message upon the control module receiving the audio message.

Preferably, the control module may further have a wireless communication unit connected to the connective unit and the wireless broadcasting unit. In an embodiment, when the second device receives an audio message the second device is configured to transmit the audio message to the control module by the second interface or the wireless communication unit.

Preferably, the control module may further have a wireless communication unit connected to the connective unit and the wireless broadcasting unit. In an embodiment, the control module may further have an audio input unit connected to the connective unit and the wireless communication unit and for receiving an audio input message, and the control module is configured to transmit the audio input message to the second device through the wireless communication unit or the connective unit.

Preferably, the first interface may comprise a USB Type-A standard interface.

Preferably, the second interface may comprise a USB Type-A, USB Type-B, USB Type-AB, Mini-USB, or Micro-USB standard interface.

Preferably, the connective transmission device may further comprise a connective line for transmission, by which the connective unit is connected to the second interface. In the embodiment, the connective line for transmission may comprise a cable, and an antenna by which the wireless broadcasting unit receives a broadcasting message.

DETAILED DESCRIPTION OF THE PREFERRED EMBODIMENTS

Figure 1:
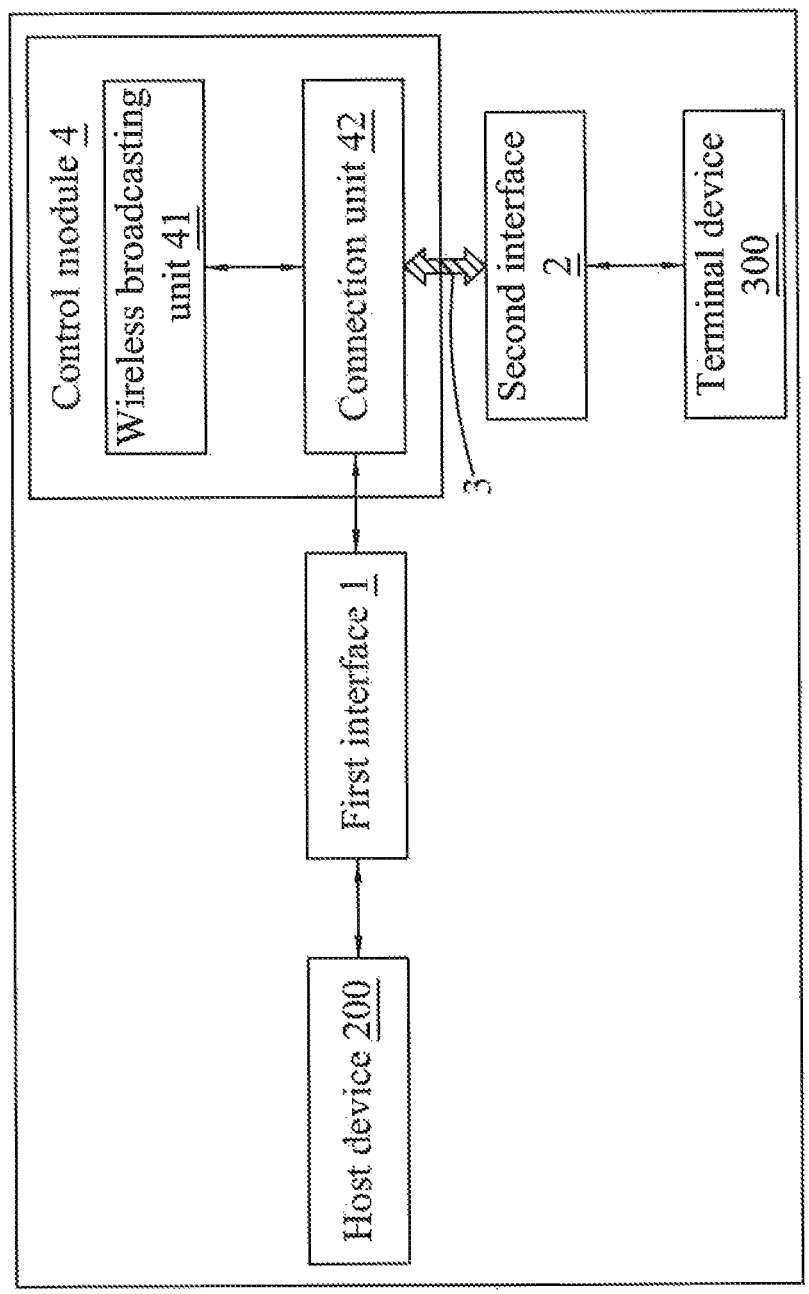
FIG. 1 is a first schematic view of a connective transmission device according to an embodiment of the present invention.

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. In addition, it's noted that the terms "to connect" and "connected to" are used herein to encompass possibilities of direct and indirect (potential) connections.

With reference to FIG. 1 for a first schematic view of a connective transmission device according to an embodiment of the present invention. As can be seen in FIG. 1, the connective transmission device 100 in this embodiment includes a first interface 1, a second interface 2, a connective transmission line 3 and a control module 4, and the control module 4 further includes a wireless broadcasting unit 41 and a connection unit 42. First interface 1 is configured to connect to a host device 200 (i.e. first device) and the connection unit 42 of the control module 4. A second interface 2 is configured to connect to a terminal device 300 (i.e. second device) and an end of a connective transmission line 3. Another end of the connective transmission line 3 is configured to connect to the control module 4 for connecting to the terminal device 300 through the connective transmission line 3. A wireless broadcasting unit 41 and the connection unit 42 of the control module 4 connect to each other. Wherein, a first interface 1 may be USB Type-A, connects to a power supply terminal, PC, laptop, tablet PC and a host device 200 including an USB host interface, The second interface 2 may be USB Type-A, USB Type-B, USB Type-AB, Mini-USB, and Apple Connector and so on, to connect to the terminal device 300, such as any of aforementioned cell phone, tablet PC, PDA; . . . etc. The wireless broadcasting unit 41 may be FM or AM Radio. Each of above-mentioned interfaces, modules and units are one or more exemplary aspects, and shall not be subject to this restriction.

In accordance with foregoing description, when the first interface 1 and the second interface 2 of the connective transmission device 100 are respectively connected to the host device 200 and the terminal device 300, through connecting to the connection unit 42, the host device 200 and the terminal device 300 may conduct data transmission, or provide power to the terminal device 300. The wireless broadcasting unit 41 may selectively receive and play a media message or a broadcasting message. The media message may be transmitted from the host device 200 or the terminal device 300 to the wireless broadcasting unit 41 by means of the connection unit 42, and through the connection unit 42 to controls the wireless broadcasting unit 41 to play the media message by host device 200 or the terminal device 300. Wherein, the media message may be music, language and so on. The broadcasting message may be sent by broadcasting station and being received and played through the wireless broadcasting unit 41 of the connective transmission device 100 or may also conduct controlling through the connection unit 42 by the host device 200 or the terminal device 300, so that the broadcasting message may be transmitted to the host device 200 or the terminal device 300.

In accordance with foregoing description, the connective transmission device 100 may not only being served as the USB transmission line, but also provide user to play music data loaded in the host device 200 or the terminal device 300 by means of the connective transmission device 100. The connective transmission device 100 may also use for listening FM or AM.

Figure 2:
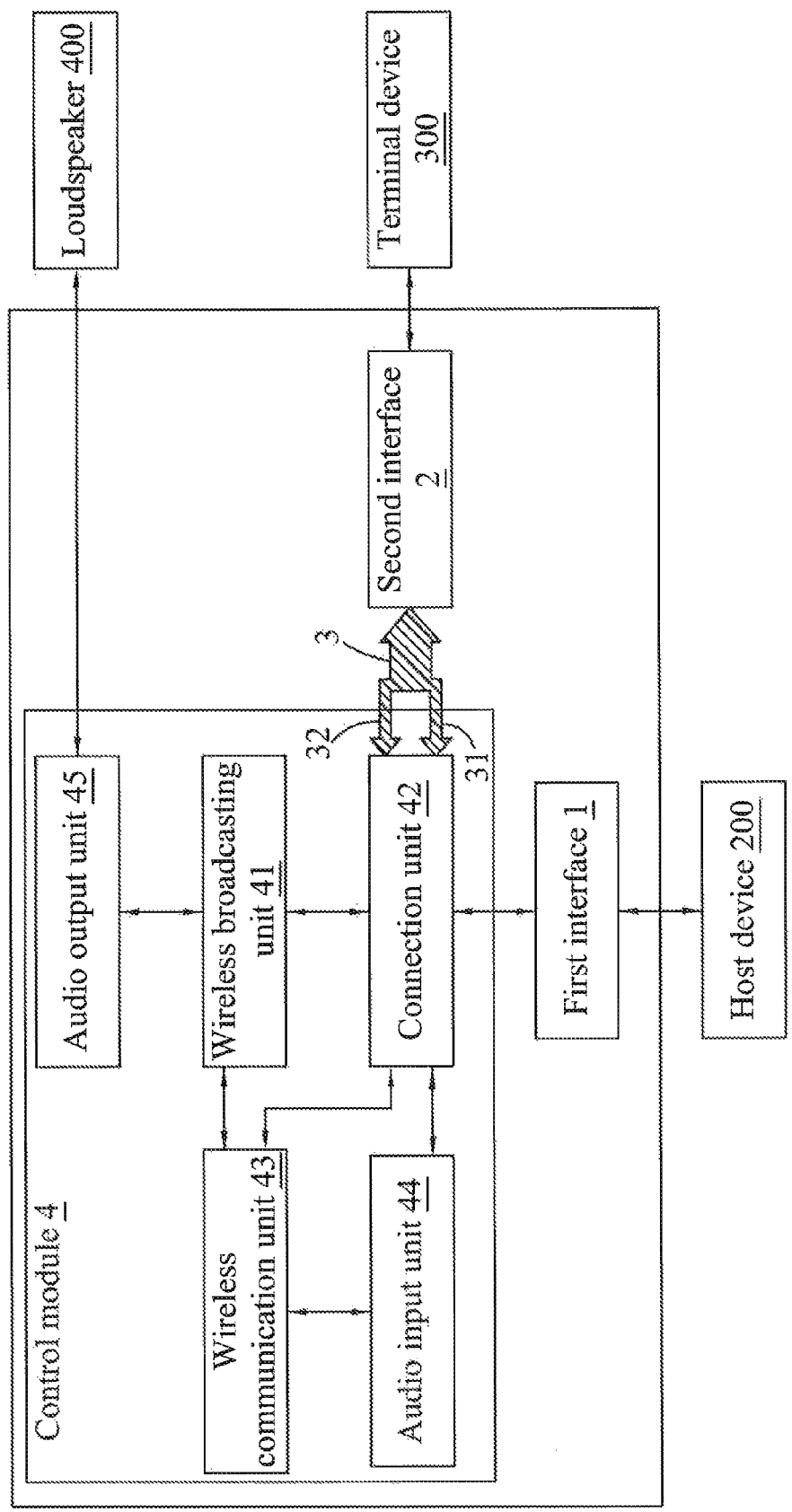
FIG. 2 is a second schematic view of a connective transmission device according to an embodiment of the present invention.

With reference to FIG. 2 for a second schematic view of a connective transmission device according to an embodiment of the present invention. As can be seen in FIG. 2, in addition to the functions of the connective transmission device 100 mentioned in FIG. 1, the control module 4 further comprises a wireless communication unit 43, an audio input unit 44 and an audio output unit 45. And the connective transmission line 3 further comprises a cable line 31 and an antenna 32. The wireless communication unit 43 is configured to connect to a wireless broadcasting unit 41, a connection unit 42 and an audio input unit 44, and an audio input unit 44 connects to the connection unit 42, an audio output unit 45 is configured to connect to the wireless broadcasting unit 41. The antenna 32 may being served as receiving broadcasting message sent by broadcasting station for the wireless broadcasting unit 41. Wherein, the wireless communication unit 43 may be Bluetooth or WLAN system, such as WiFi, or other NFC control system, such as infrared rays. However these are exemplary embodiments, and shall not be subject to this restriction.

In accordance with foregoing description, the host device 200 and the terminal device 300 may further comprise Bluetooth, WLAN communication and so on, which enables user to conduct transmitting and playing media message and broadcasting message through the connection unit 42 connected by the first interface 1 and the second interface 2 of USB, user may also be able to turn on Bluetooth or WiFi of the host device 200 or the terminal device 300 to transmit media message to the wireless broadcasting unit 41 through the wireless communication unit 43, or play the media message by means of the wireless broadcasting unit 41. Broadcasting message may also being transmitted to one or both of the host device 200 and the terminal device 300 through the wireless communication unit 43.

In addition, when the terminal device 300 is mobile communication device, voice communication to user is provided and transmitting voice reception message to the control module 4 through the second interface 2 or the wireless communication unit 43 when the terminal device 300 is receiving a voice reception message. The aforementioned audio input unit 44 is functioned as a microphone to provide user to input an audio input message. As a result, when user is conducting voice communication, he/she may utilize the connective transmission device 100 as hands-free and directly proceed to receive and send message through the connective transmission device 100. Moreover, the audio output unit 45 may selectively connect to a loudspeaker 400 for selectively broadcasting the media message, broadcasting message or voice reception message through the loudspeaker 400.

Figure 3:
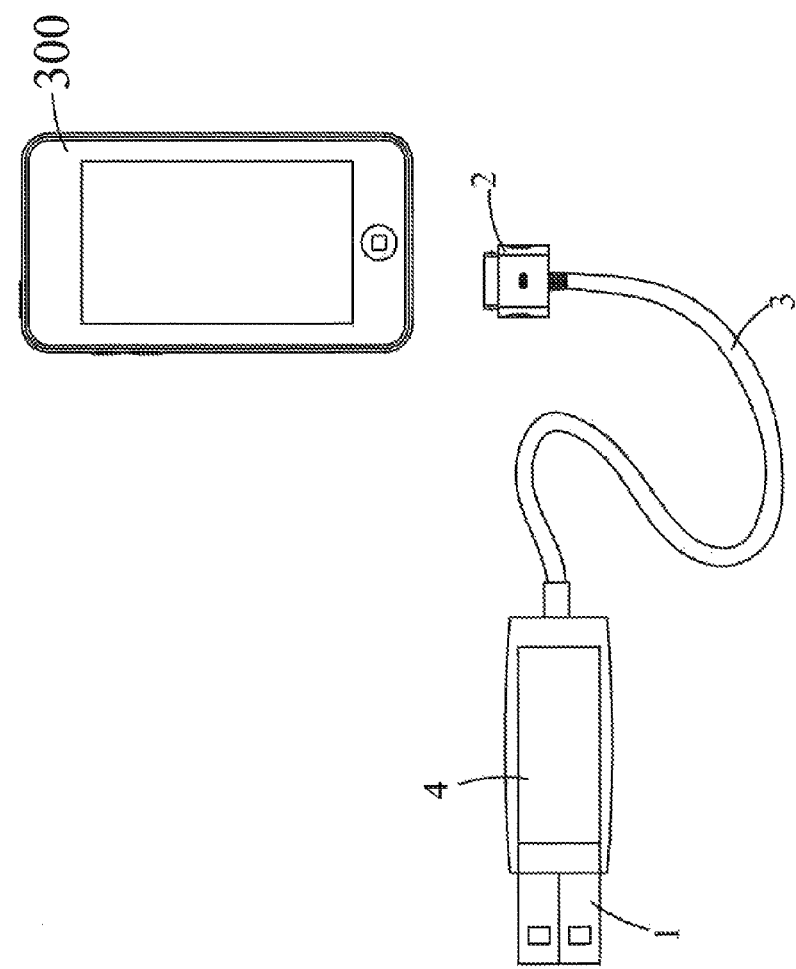
FIG. 3 is a schematic view of a connective transmission device according to a first embodiment of the present invention.
Figure 3:
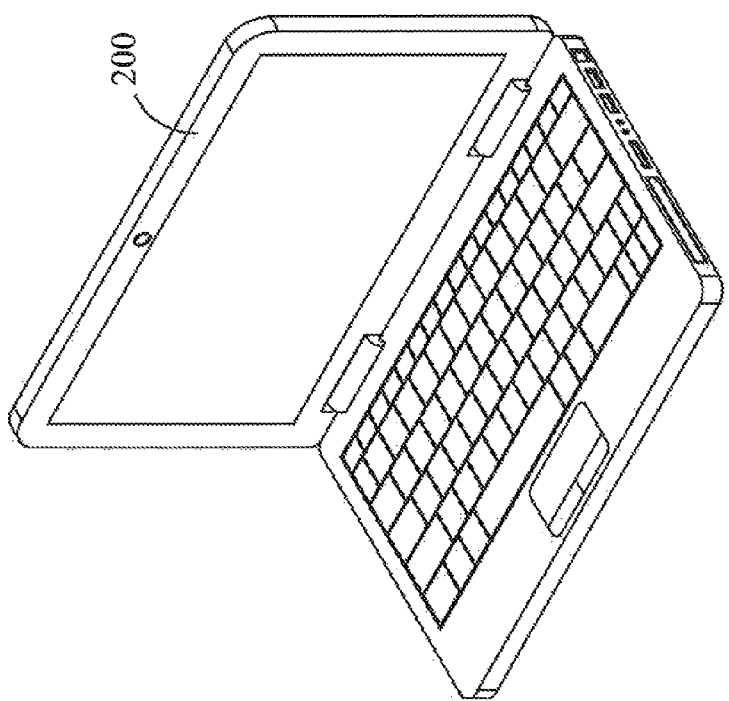

With reference to FIG. 3 for a schematic view of a connective transmission device according to a first embodiment of the present invention. The embodiment comprises a host device 200, which may be a PC; a terminal device 300, which is a smartphone; and the connective transmission device 100 as demonstrated in FIG. 1 or FIG. 2. When the host device 200 connects to the connective transmission device 100 having USB with the first interface 1 and the terminal device 300 connects to the connective transmission device 100 having USB with the second interface 2, the host device 200 may correspond to the terminal device 300, or the host device 200 and the terminal device 300 may correspond to transmit data, or control the connective transmission device 100 to play media message or broadcast. In case one of the host device 200 and the terminal device 300 or combination thereof does not connect to the first interface 1, the second interface 2, one of the host device 200 and the terminal device 300 or combination thereof may connect to the connective transmission device 100 through Bluetooth, WiFi and other wireless means to control the connective transmission device 100.

Figure 4:
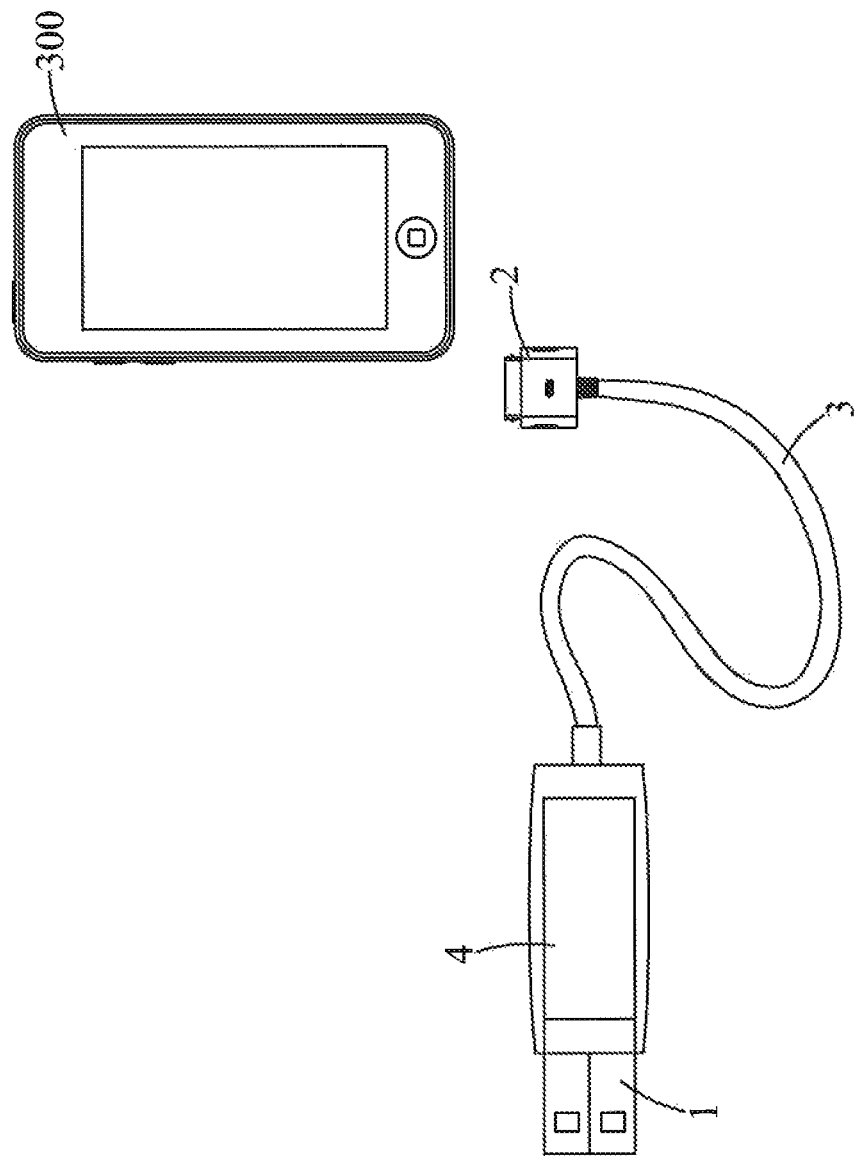
FIG. 4 is a schematic view of a connective transmission device according to a second embodiment of the present invention.
Figure 4:
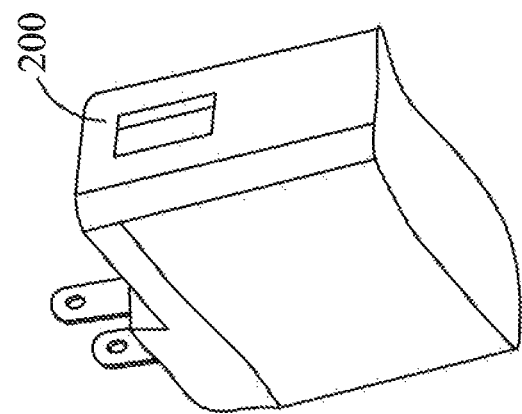

With reference to FIG. 4 for a schematic view of a connective transmission device according to a second embodiment of the present invention. The embodiment comprises a host device 200, which may be a power supply charging device; a terminal device 300, which is a smartphone; and a connective transmission device 100 as demonstrated in FIG. 1 or FIG. 2. When the host device 200 reciprocally connects to the terminal device 300 through the connective transmission device 100, transmitting power to the terminal device 300 through the host device 200 to conduct charging. The terminal device 300 controls the connective transmission device 100 through USB or Bluetooth or other short range transmission means, such as control over media message transmission or broadcasting.

Figure 5:
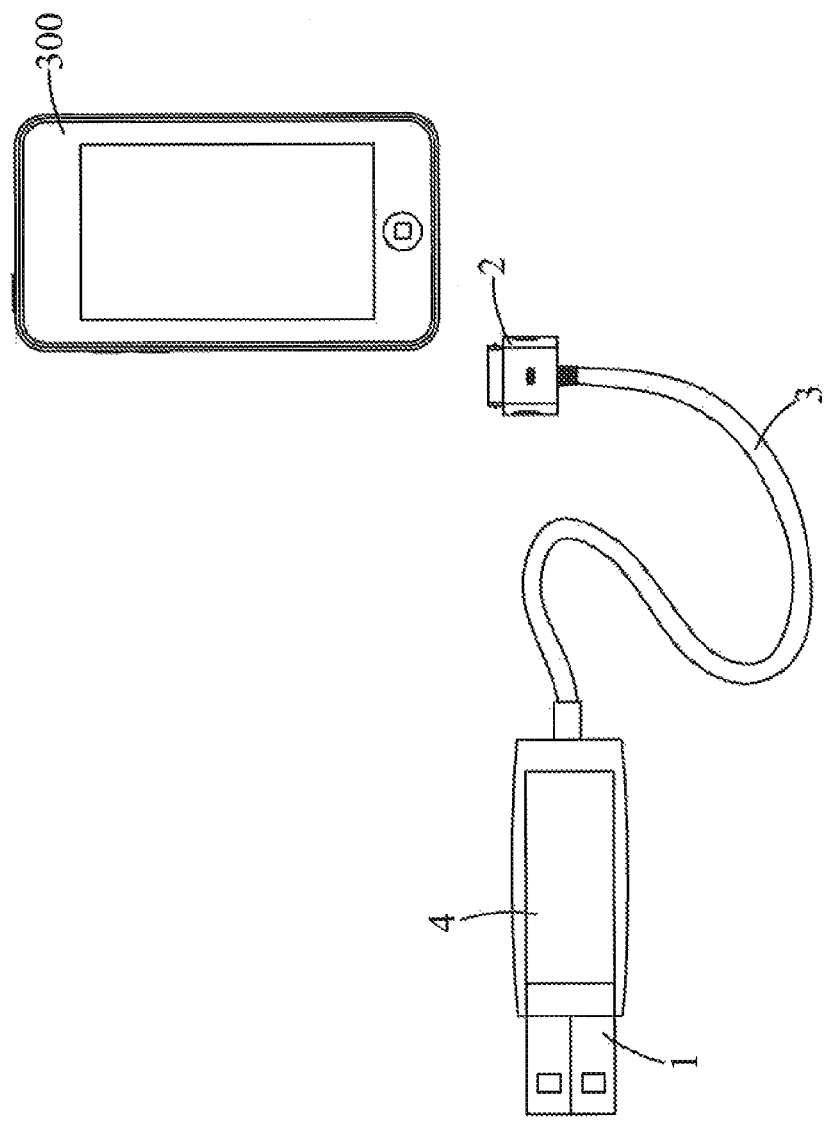
FIG. 5 is a schematic view of a connective transmission device according to a third embodiment of the present invention.
Figure 5:
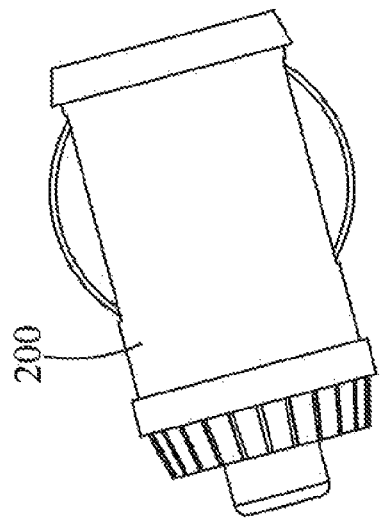

With reference to FIG. 5 for a schematic view of a connective transmission device according to a third embodiment of the present invention. The embodiment comprises a host device 200, which may be a charger for vehicle; a terminal device 300, which is a smartphone; and a connective transmission device 100 as demonstrated in FIG. 1 or FIG. 2. The host device 200 may conduct charging to terminal device 300 through the connective transmission device 100. The terminal device 300 may transmit media message to the connective transmission device 100 through USB or Bluetooth or other short range transmissions means, and to play and control the media message to the connective transmission device 100.

Figure 6:
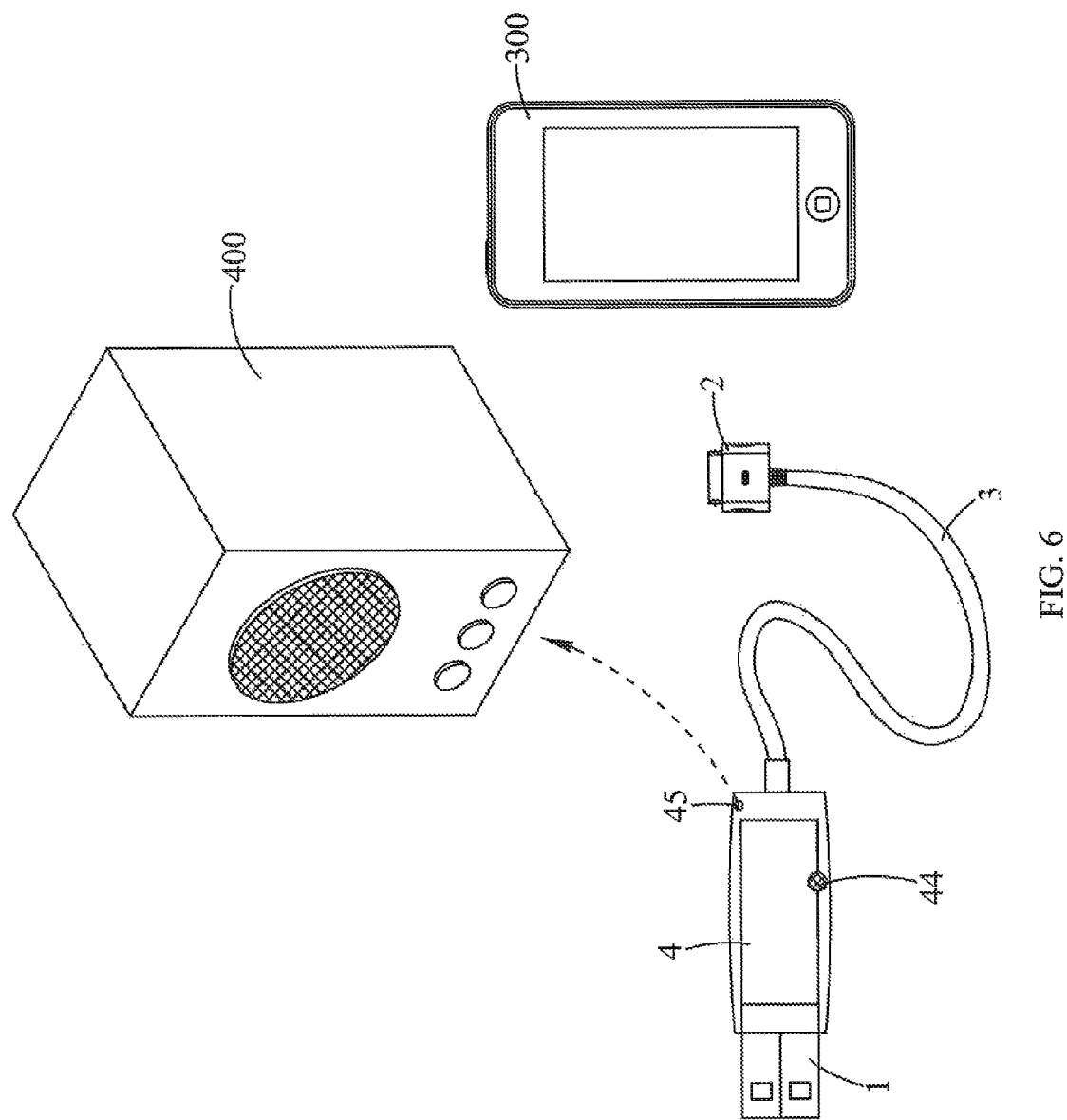
FIG. 6 is a schematic view of a connective transmission device according to a fourth embodiment of the present invention.

With reference to FIG. 6 for a schematic view of a connective transmission device according to a fourth embodiment of the present invention. The embodiment comprises a terminal device 300, which is a smartphone; a connective transmission device 100 as demonstrated in FIG. 2; and a loudspeaker 400. An audio output unit 45 of the connective transmission device 100 may connect to the loudspeaker 400 to output music, voice and so on. When user is communicating by means of the terminal device 300, he/she may connect to the connective transmission device 100 through USB or Bluetooth and other short range transmission means to output the audio of caller through the wireless broadcasting unit 41 of the connective transmission device 100 as well as input audio through the audio input unit 44 of the connective transmission device 100 for hands-free.

In summary, depending on circumstances accompanying various embodiments of the connective transmission device of the present invention, one or more of the following advantages may (and may not) be attributable to the present invention:

(1) The connective transmission device utilizes a USB connective line which is the same as aforementioned, but further comprises functions of Bluetooth communication, wireless broadcasting and multimedia broadcasting.

(2) The connective transmission device may enable the user to use USB transmission, Bluetooth transmission and broadcasting simultaneously as well as perform the host and terminal devices connected by both interfaces to proceed to conduct charging, data transmission, video playing and so on.

(3) The connective transmission device is applicable to user for controlling and utilizing broadcasting through USB connective line or Bluetooth communication by either the host or terminal device.

(4) The connective transmission line of the connective transmission device is USB connective line, which is also served as an antenna for wireless broadcasting.

(5) The connective transmission device is easy to storage, the same as storing USB transmission line. And the Bluetooth and broadcasting of the connective transmission device may be combined to serve as hands-free if the terminal device is a cell phone.

(6) The connective transmission device may also be designed as Bluetooth-free, which only transmits message by transmission line or wireless broadcasting.

(7) The second interface included in the connective transmission device may be an interface with any specifications, such as Micro USB, Apple Connector or any interfaces with USB.

To sum up, the connective transmission device 100 of the present invention may provide user with USB connection, Bluetooth transmission, and wireless broadcasting and so on at the same time. The connective transmission device 100 may also with hands-free, which is convenient to use and easy to store to user.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A connective transmission device, comprising:
a first interface, configured to connect to a first device;
a second interface, configured to connect to a second device; and
a control module, connected to the first interface and the second interface, wherein when the first interface is connected to the first device and the second interface is connected to the second device the control module is configured to connect the first device and the second device for data transmission or power transmission, or configured to receive a media message from the first device or the second device;

wherein the control module further comprises a wireless broadcasting unit configured to receive or broadcast a broadcasting message.

2. The connective transmission device of claim 1, wherein the control module further has a wireless communication unit configured to receive by wireless communication the media message from the first device or the second device.

3. The connective transmission device of claim 1, wherein the control module further has a wireless communication unit configured to transmit by wireless communication the broadcasting message to the first device or the second device, or the broadcasting message is to be transmitted by wire communication to the first device via the first interface or to the second device via the second interface.

4. The connective transmission device of claim 1, wherein the control module further has an audio output unit for connecting to a loudspeaker for reproducing or broadcasting the media message, the broadcasting message, or an audio message upon the control module receiving the audio message.

5. The connective transmission device of claim 1, wherein the control module further has a wireless communication unit, and when the second device receives an audio message the second device is configured to transmit the audio message to the control module by the second interface or the wireless communication unit.

6. The connective transmission device of claim 5, wherein the control module further has an audio input unit for receiving an audio input message, and the control module is configured to transmit the audio input message to the second device via the wireless communication unit or the second interface.

7. The connective transmission device of claim 1, wherein the first interface comprises a USB Type-A standard interface.

8. The connective transmission device of claim 1, wherein the second interface comprises a USB Type-A, USB Type-B, USB Type-AB, Mini-USB, or Micro-USB standard interface.

9. A connective transmission device, comprising:
a first interface configured to connect to a first device;
a second interface configured to connect to a second device; and
a control module connected to the first interface and the second interface and including:
a wireless broadcasting unit configured to receive or broadcast a media message; and
a connective unit connected to the first interface, the second interface, and the wireless broadcasting unit, wherein when the first interface is connected to the first device and the second interface is connected to the second device, the connective unit is configured to connect the first device and the second device for data transmission or power transmission, and enable the first device or the second device to direct the wireless broadcasting unit to broadcast the media message.

10. The connective transmission device of claim 9, wherein the control module further has a wireless communication unit connected to the connective unit and the wireless broadcasting unit, and the wireless communication unit is configured to transmit the media message from the first device or the second device to the wireless broadcasting unit.

11. The connective transmission device of claim 10, wherein the wireless communication unit is configured to operate under Bluetooth standard or a standard for a wireless local area network.

12. The connective transmission device of claim 10, wherein the wireless broadcasting unit is configured to receive or broadcast a broadcasting message, and is configured to transmit the broadcasting message to the first device or the second device through the connective unit or the wireless communication unit.

13. The connective transmission device of claim 12, wherein the control module further has an audio output unit connected to the wireless broadcasting unit and configured to connect to a loudspeaker for reproducing or broadcasting the media message, the broadcasting message, or an audio message upon the control module receiving the audio message.

14. The connective transmission device of claim 9, wherein the control module further has a wireless communication unit connected to the connective unit and the wireless broadcasting unit, and when the second device receives an audio message the second device is configured to transmit the audio message to the control module by the second interface or the wireless communication unit.

15. The connective transmission device of claim 9, wherein the control module further has a wireless communication unit connected to the connective unit and the wireless broadcasting unit, the control module further has an audio input unit connected to the connective unit and the wireless communication unit and for receiving an audio input message, and the control module is configured to transmit the audio input message to the second device through the wireless communication unit or the connective unit.

16. The connective transmission device of claim 9, wherein the first interface comprises a USB Type-A standard interface.

17. The connective transmission device of claim 9, wherein the second interface comprises a USB Type-A, USB Type-B, USB Type-AB, Mini-USB, or Micro-USB standard interface.

18. The connective transmission device of claim 9, further comprising a connective line for transmission, by which the connective unit is connected to the second interface.

19. The connective transmission device of claim 18, wherein the connective line for transmission comprises a cable, and an antenna by which the wireless broadcasting unit receives a broadcasting message.

* * * * *